United States Patent [19]

Wong

[11] Patent Number: 4,710,013
[45] Date of Patent: Dec. 1, 1987

[54] AUTOMATIC FOCUSING MECHANISM FOR CAMERA

[75] Inventor: Wai C. Wong, North Point, Hong Kong

[73] Assignee: W. Haking Enterprises Limited, North Point, Hong Kong

[21] Appl. No.: 900,718

[22] Filed: Aug. 27, 1986

Related U.S. Application Data

[63] Continuation-in-part of Ser. No. 785,572, Oct. 8, 1985, abandoned, and Ser. No. 891,360, Jul. 29, 1986, abandoned.

[51] Int. Cl.$^4$ .......................... G03B 3/00; G03B 7/16; G03B 15/03; G03B 7/085
[52] U.S. Cl. .................................... 354/419; 354/421; 354/423; 354/402; 354/446
[58] Field of Search ................................ 354/400–408, 354/420–423, 446–448, 195.1, 195.11, 419

[56] References Cited

U.S. PATENT DOCUMENTS

| | | | |
|---|---|---|---|
| 3,598,031 | 8/1971 | Harvey | 354/195.1 |
| 3,618,499 | 11/1971 | Harvey | 354/403 X |
| 3,643,577 | 2/1972 | Monachesi | 354/195.1 |
| 4,063,260 | 12/1977 | Toyoshima | 354/195.11 |
| 4,178,083 | 12/1979 | Iijima | 354/423 |
| 4,199,235 | 4/1980 | Matsuda et al. | 354/408 |
| 4,247,187 | 1/1981 | Tamura | 354/408 |
| 4,250,377 | 2/1981 | Wilwerding | 250/204 |
| 4,339,186 | 7/1982 | Yamazaki | 354/441 |
| 4,362,372 | 12/1982 | Kiesel | 354/195.11 |
| 4,417,794 | 11/1983 | Nakai et al. | 354/446 |
| 4,549,801 | 10/1985 | Winter | 354/403 |

FOREIGN PATENT DOCUMENTS

2015181  9/1979  United Kingdom .

*Primary Examiner*—W. B. Perkey
*Attorney, Agent, or Firm*—Stephen R. Arnold; Russell E. Hattis

[57] ABSTRACT

An automatic focusing camera is operated between daylight and flash modes automatically responsively to ambient light photosensings. The lens is operable between a near-focus setting and a far-focus setting, taking the far-focus setting automatically in the daylight mode. In flash mode the aperture is automatically set to its maximum value, whereas in daylight mode the aperture is automatically set to one of at least two reduced aperture settings. The largest aperture setting in daylight mode is the hyperfocal aperture setting corresponding to the far-focus lens setting. A further reduction in aperture below the hyperfocal value is governed by a filmspeed entry system and ambient light sensings. The changeover threshold between daylight and flash mode is also governed by the filmspeed entry system.

10 Claims, 11 Drawing Figures

AUTOMATIC FOCUSING MECHANISM FOR CAMERA

RELATED APPLICATIONS

This application is a continuation-in-part of U.S. patent application Ser. No. 785,572 filed Oct. 8, 1985, and No. 891,360 filed July 29, 1986, both abandoned.

TECHNICAL FIELD

The technical field of the invention is photographic cameras, and in particular cameras which provide an automatic focusing feature.

BACKGROUND OF THE INVENTION

A large number of relatively inexpensive still cameras are currently manufactured which provide an automatic focusing capability and/or automatic exposure control governed by either ambient illumination for outdoor photography or by a sensing of the object distance when used in flash mode. Ranging sensings used to govern lens focusing, as well as exposure during flash mode, are provided by a variety of systems. Ranging by ultrasonic pulses produced by the camera, electronic comparison of the images in a split-image rangefinder, and the reflected amplitude of an infra-red preflash all are well-described in the patent literature. In flash mode, exposure control is governed typically by one of the aforementioned range sensings, whereas in the ambient illumination mode, some form of weighted value of the scene illumination as detected by a photosensor is typically used to govern exposure.

In the case of intermediate and higher-priced cameras, such systems are routinely provided. On the other hand, in the case of the low-cost camera, the expense of providing such range-sensing systems becomes prohibitive. Moreover, such low-cost cameras are not in general purchased by for the serious amateur, but rather by people who either use a camera only on rare occasions, or who are relatively inexperienced, or both. Even the most rudimentary manual exposure and focus adjustments are frequently overlooked by such users.

Thus, there remains a need in the low-priced camera field for a completely automatic focus and exposure system which will give adequate results both as to focus and exposure in totally inexperienced hands.

SUMMARY OF THE INVENTION

According to one of the features of the invention of the parent application, a camera having flash capability is provided with an ambient illumination sensor and a lens focusable between near and far focus settings and is automatically coupled to operate a two-position exposure control When the detected ambient light is low, implying a need for flash illumination, upon actuation of the shutter release mechanism, associated control mechanisms set the shutter aperture to its maximum value, e.g., f/4.5, while simultaneously setting the lens focus to a near-zone focusing range of 5 to 12 feet. Thus, the reduced depth of field associated with large shutter aperture is compensated for by adjusting the lens to a focusing range appropriate for short-range flash work. On the other hand, in the event that adequate ambient illumination is sensed, as is normally the case in outdoor photographic work during bright daylight hours, a focus-aperture combination is automatically commanded providing for a reduced aperture, e.g., f/8, and a focus setting where the lens is set to the hyperfocal distance corresponding to that aperture, such as 12 feet for a 55 mm. lens. By this means, during daylight exposures, the camera is automatically set for sharp focus from half the hyperfocal distance to infinity The need for an expensive range sensing system is thus totally eliminated.

According to a feature of the present invention, a further reduction of the aperture below f/8 than that corresponding to the hyperfocal lens setting is provided automatically for use with higher speed photographic films. This has the effect of further sharpening the photographic image of objects positioned close to the boundaries of the depth of field, i.e., 6 feet and infinity. According to a related feature of the invention, the changeover from daylight to flash mode is also governed by filmspeed sensings.

Other advantages and aspects of the invention will become apparent upon making reference to the specification, claims, and drawings to follow.

While it is possible that there may have been prior camera systems which used manual settings of a two-position focus system usable selectively in manually set flash and normal modes of operation, no cameras having automatic settings of these parameters have to the applicant's knowledge been heretofore produced.

DETAILED DESCRIPTION

Figure 1:
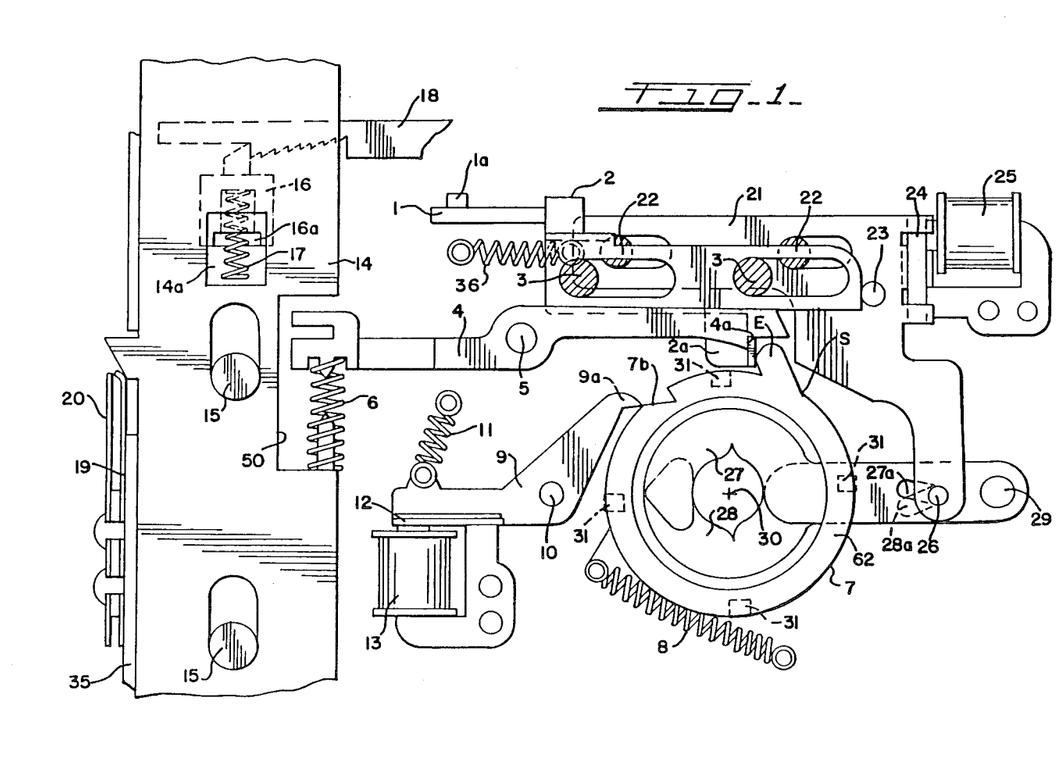
FIG. 1 is a partial cutaway view of the principal elements of a camera having photosensor-controlled focus and aperture settings, showing the system in the dormant cocked condition.
Figure 5:
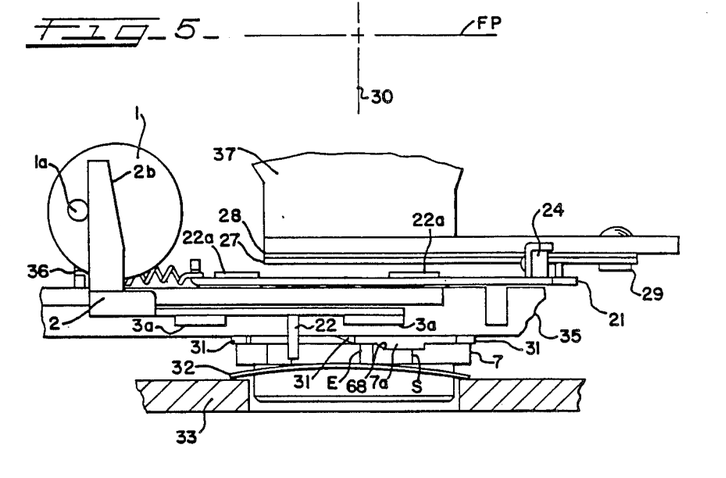
FIG. 5 is a partial cutaway plan view of the system shown in FIGS. 1–4 and generally corresponding to the situation shown in FIG. 2, i.e., the near-focus configuration.
Figures 7, 8:
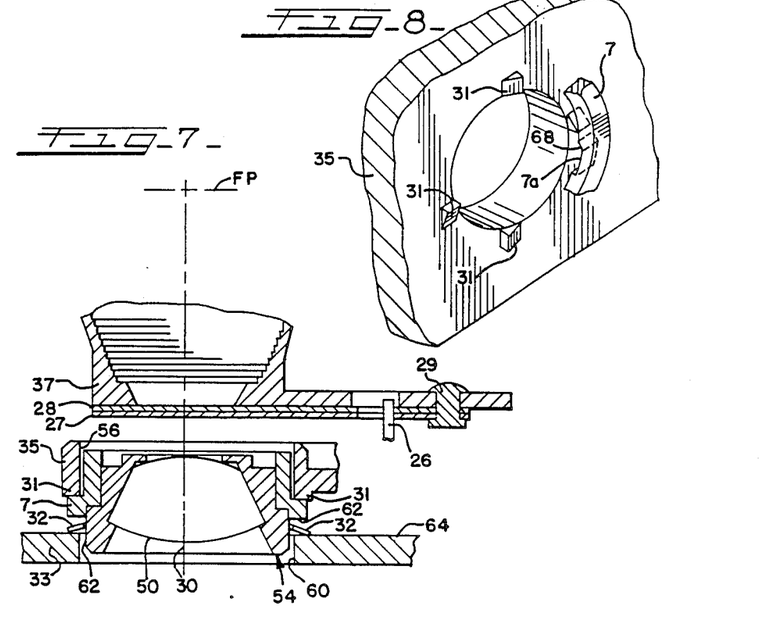
FIG. 7 is a partial cutaway view of a lens cell assembly confronting a pair of aperture adjusting blades.
FIG. 8 is a partial cutaway perspective view showing a camming action of four ramps mounted on a front camera wall to exert an axial force on a portion of the lens cell assembly shown in FIG. 7 to change the focusing position of the lens.

The subject matter of the invention is an aperture and focus adjusting system for a camera governed solely by ambient light sensings. FIGS. 1 and 5 show in partially cutaway form the arrangement of the principal elements of the system. The system as shown in FIG. 1 is in a dormant cocked condition. A lens focusing ring 7 is coupled so as to move a picture-taking lens 50 (see FIG. 7) along the optic axis 30 of the system. As seen in FIG. 1, counterclockwise rotation of the focusing ring 7 moves the focusing range of the lens 50 from a short-focus to a long-focus position. This counterclockwise movement of the focusing ring 7 is induced by a spring 8 coupled thereto. A focus control solenoid 13 is selectively actuated by a photosensor-controlled sensor flash system 42 (FIG. 9) to act upon an armature 12 attached to a focus locking lever 9 rotatably mounted upon a pivot 10 and urged clockwise by a tensioning spring 11. A pawl end 9a generally confronts the outer rim of the focusing ring 7, either in a generally retracted position shown in FIG. 1, or alternatively to a released condition so that the pawl will lockingly engage a notch 7b in the focusing ring to arrest rotation of the focusing ring during adjustment of the system.

A pair of aperture-controlling blades 27,28 overlie each other, each blade being pivotally mounted to a common pivot 29. Each blade is provided with a cutout slot 27a-28a positioned so that a common entry region is formed therebetween, through which a pin 26 mounted on an aperture control slide 21 passes. The cutout slots 27a,28a are angled with respect to each other such that a leftward movement of the pin 26 will cause the blades to swing together so as to close down the aperture of the optical system. Thus, according to whether the pin 26 is moved to the right or to the left, the aperture of the camera can be adjusted between extreme values.

The aperture control slide 21 is slidably mounted on guide pins 22-22 and captively retained by retention bosses 22a-22a (FIG. 6) mounted on a main mounting wall 35, permitting general left-right motion of the aperture control slide 21 as seen in FIG. 1. The aperture control slide 21 is urged to the left by a spring 36. An aperture control solenoid 25 is positioned to contactingly engage an armature 24 captively retained in the righthand end of the aperture control slide when the system is in a cocked position, and is capable of overcoming the tensile force of the spring 36.

A lens cocking slide 2 is slidably mounted on the front surface of the main mounting wall 35 by means of pins 3-3 and captively secured thereto by retention bosses 3a-3a. The lens cocking slide 2 is thus also linearly slidable between left and right positions thereof as seen in FIG. 1.

A focus release lever 4, rotatably mounted on a pivot 5, is urged clockwise by a restoring spring 6, and is provided with a notch 4a configured to lockingly confront an extension tab 2a on the lens cocking slide 2, thereby holding this element is its rightmost position. The lens cocking slide 2, in turn, engages a pin 23 on the aperture control slide 21 to hold the aperture control slide in its rightmost condition with its armature 24 contacting the aperture control solenoid 25, against the force of its restoring spring 36. This configuration also holds the focusing ring 7 in an extreme clockwise position against the force of the focusing ring actuating spring 8 by engagement of the extension tab 2a with a boss E extending outwardly from the periphery of the focusing ring from a shoulder line S.

Rotating the focus release lever 4 counterclockwise sufficiently to disengage from the extension tab 2a will remove the opposing force from the focusing ring boss E, allowing the focusing ring 7 to be driven counterclockwise by its energizing spring 8. No opposition is encountered from the lens cocking slide 2, since this element is not directly spring biased. If the aperture control solenoid 25 remains energized during this operation, the focusing ring boss E will merely drive the lens cocking slide 2 along with it as it rotates. In the event that the aperture control solenoid 25 is not energized during this phase, the aperture control slide 21 will further be driven in the same direction by engagement with pin 23. The principal function of the lens cocking slide 2 is merely to restore the system to a cocked condition during a film-advancing operation.

Considering next the basic sequence of operations of the various systems shown during a picture-taking operation, pressure applied to a shutter button (not shown) acts on a release slide 14, slidably mounted on pins 15-15, to move downward. The immediate effect of initial downward movement is to cause switch contacts 19-20 to be urged into contact by a camming surface 44 on the release slide 14. This causes immediate actuation of the focus activation switch 46 (FIG. 9), representing switch contacts 19-20, to a closed condition to actuate one of the two solenoids 13,25 to an "ON" condition, according to sensings of a ambient illumination sensor 48. Further depression of the slide release 14 causes a cutout 50 to engage one end of the focus release lever 4, causing a counterclockwise rotation thereof, thereby causing the notch 4a in the end of the focus release lever to move out of its confronting position with respect to extension tab 2a of the lens cocking slide 2. As will subsequently be discussed in detail, the focus and aperture systems then proceed to go through independent adjustment.

The release slide 14 has a cutout 14a therein through which an extension 16a of a shutter release member 16, urged upward by an energizing spring 17, extends. The cutout 14a is configured sufficiently long that with the release slide 14 in its uppermost position, a substantial distance is provided between the upper edge of the cutout 14a and the confronting edge of the extension 16a of the shutter release member. A shutter energizing slide 18 is captively held in the cocked position by the shutter release member 16, and is urged to the left by a slide energizing spring (not shown). A final terminal downward movement of the shutter release member 16 after system adjustments are complete will cause release of the shutter energizing slide, whereupon it snaps to the left so as to actuate the shutter (not shown) through an exposure cycle. Release of downward pressure to the release slide 14 causes the slide to move upward under the influence of an associated biasing spring (not shown) so as to allow the switch contacts 19,20 to spring apart to allow reversion of the solenoids 13,25 to a dormant non-energized condition. This state of affairs is best shown in FIG. 4.

The particular form of shutter release and recocking system energized by the shutter energizing slide 18 may take a great variety of forms, such as that disclosed in the applicant's U.S. Pat. No. 4,595,261 issued June 17, 1986. This application discloses, among other things, the use of an eccentric pin driven by the film-advancing system to drive a shutter energizing slide 18 of the form shown in FIG. 1 to a cocked position during film advance. Restoration of the system to a cocked condition from the de-energized configuration shown in FIG. 4 to that shown in FIG. 1 is carried out by a similar eccentric-pin system, which may in fact be coupled to or be integral with the eccentric pin system restoring the shutter energizing slide 18 to a cocked condition.

Figure 3:
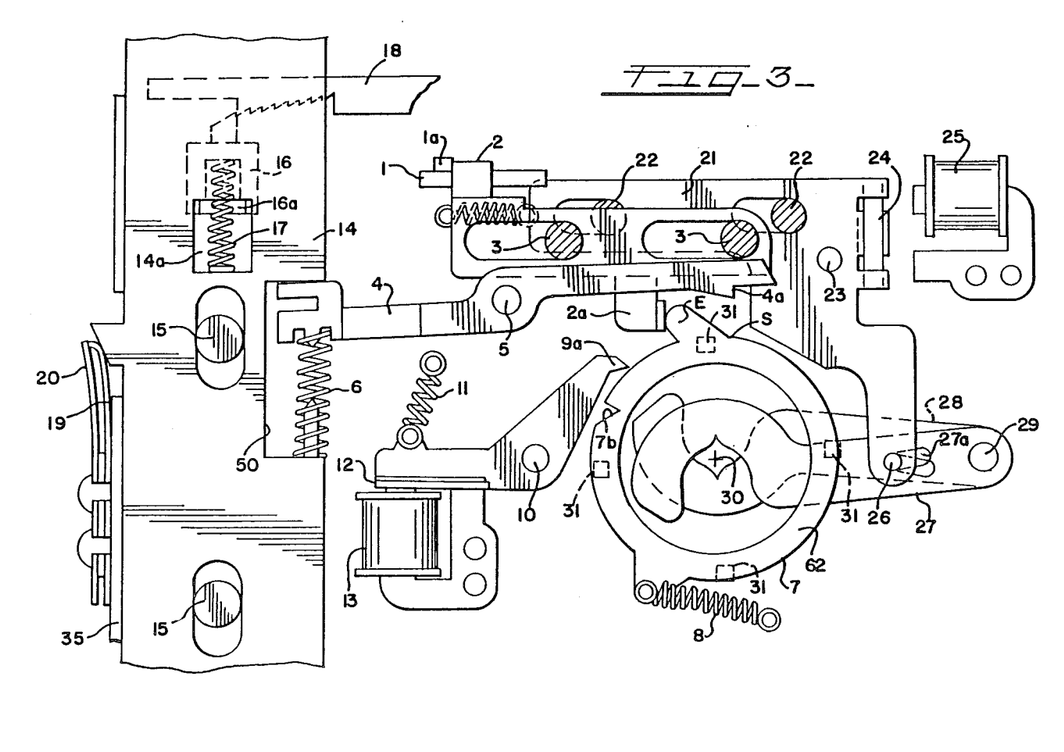
FIG. 3 shows the system of FIG. 1 with the system alternatively configured for long-range focusing and reduced aperture.
Figure 4:
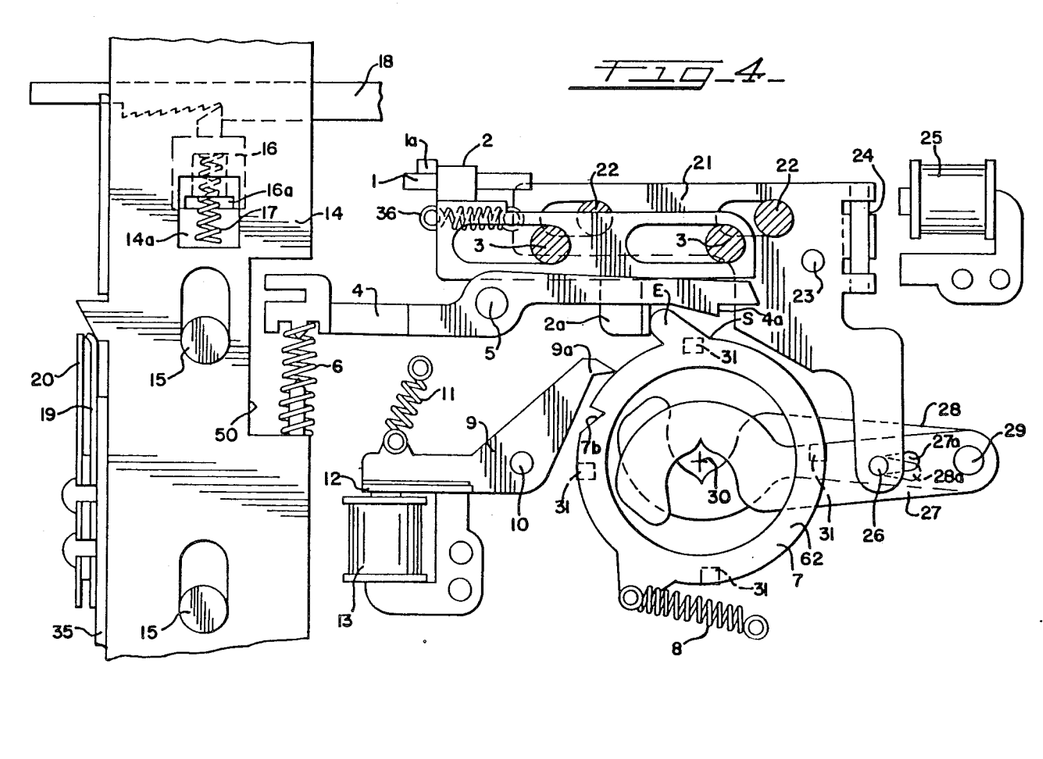
FIG. 4 shows the system of FIG. 1 in a dormant condition prior to initiation of a recocking operation.
Figure 6:
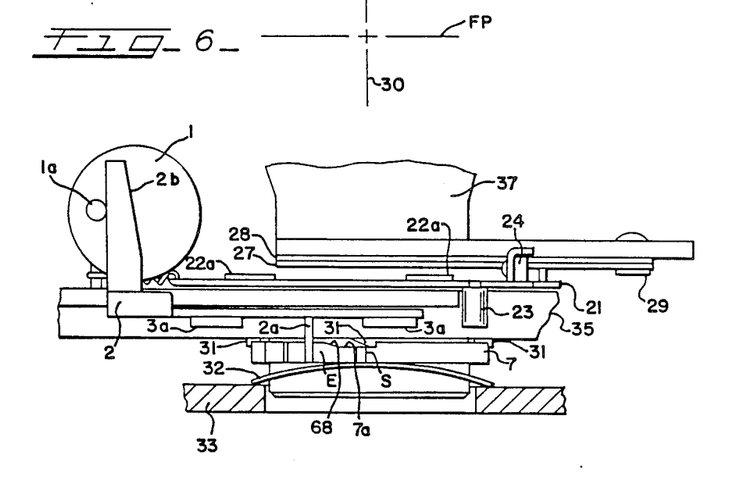
FIG. 6 is similar to the view shown in FIG. 5, but showing the system configured for long-range focus.

Thus, with particular reference to FIGS. 1, 4 and 6, an eccentric pin 1a mounted on a cocking rotor 1 is brought to bear against a cocking extension 2b on the lens cocking slide 2, so that an initial half rotation from the de-energized condition shown in FIG. 6 moves the lens cocking slide to its extreme rightmost position. Recalling that the focus release lever 4 is biased clockwise during rewind, during this half rotation of the cocking rotor 1 the extension boss E on the focusing ring 7 is first engaged by the extension tab 2a on the lens cocking slide to rotate the focusing ring 7 counterclockwise. Since the solenoids 13,25 are de-energized during rewind, the aperture control slide 21 will be in its leftward position as shown in FIG. 3, as a result of which the lens cocking slide 2 will be driven to engage pin 23 on the aperture control slide to move the aperture control slide into contact with the aperture control solenoid 25. During the terminal phases of this process, the notch 4a of the focus release lever 4 again drops into a latching engagement with the extension tab 2a of the lens cocking slide 2 to latch the entire system in the dormant cocked condition shown in FIG. 1.

Considering next in detail the operation of the focusing and aperture control subsystems of the camera during the picture-taking operation, it will be recalled that one of the two solenoids 13,25 is selectively energized according to an ambient light photosensor. Details of the control circuit shown in FIG. 9 for accomplishing this will be discussed subsequently. For the moment it is sufficient to say that during the picture-taking operation, if the ambient light is weak, indicating that the camera is to be used in flash mode ("near" mode), the aperture control solenoid 25 will be energized throughout the picture-taking process. The focus control solenoid 13 will remain de-energized. Thus, with reference to FIG. 2, it will be seen that upon release of the engagement between the notch 4a of the focus release lever 4 and the extension tab 2a of the lens cocking slide 2, the lens focusing ring 7 is immediately urged counterclockwise. Since the focus control solenoid 13 is deenergized, the pawl 9a on the end of the focus locking lever 9 is spring-urged against the rim of the focusing ring 7, and drops into the focusing ring locking notch 7b to arrest the rotation of the focusing ring before substantial rotation has occurred. As will subsequently be shown, this rotation is insufficient to move the lens 50 from its short-range focusing position, as a result of which the lens remains focused at an optimum distance of approximately 7 feet.

Figure 2:
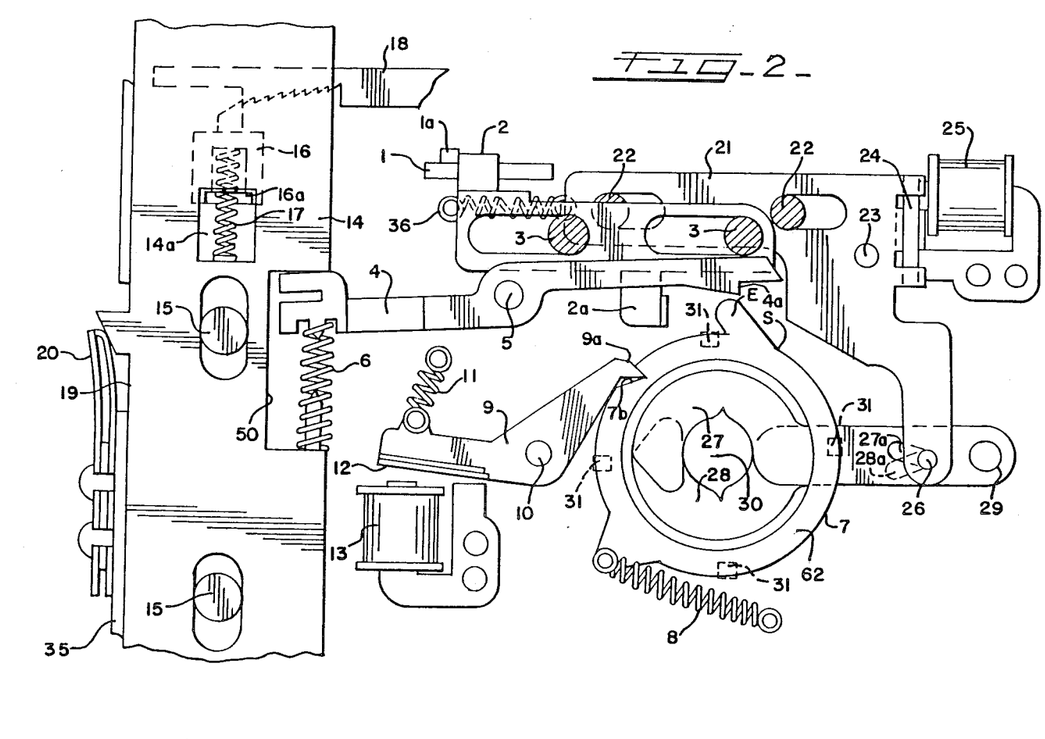
FIG. 2 shows the system of FIG. 1 immediately prior to release of a shutter energizing slide with the system configured for short-range focusing and maximum aperture.

It will be noted in FIG. 2 that the freely movable lens clocking slide 2 has been impulsively urged to the extreme leftmost limit of its travel by the impulse delivered thereto by the boss E on the focusing ring 7 during initial rotation of the focusing ring. Further, it will be noted that by retaining the aperture control solenoid 25 in an energized condition throughout this process, the aperture control slide 21 remains retained in its rightmost position against the force of its associated spring 36, holding pin 26 similarly in the rightmost position thereof, as a result of which the aperture blades 27,28 remain in the wide-aperture condition. The camera has thus been properly conditioned for "near" (flash) mode operation with the lens set to a short focusing distance and the aperture held at its maximum value. Taking a nominal value of f/4.5 for a 55 mm. lens, this yields a properly focused field extending from 5 feet to 12 feet. These values are appropriate for the normal working range of inexpensive flash cameras.

If, on the other hand, a bright ambient sensing is detected by the photosensor 48, with the camera still in the cocked state shown in FIG. 1, the focus control solenoid 13 will be energized, whereas the aperture control solenoid 25 will remain de-energized. This will cause the camera to be set to a "far" mode. The state of affairs in this case immediately after disengagement of the focus release lever notch 4a from the extension tab 2a of the lens cocking slide 2 is shown in FIG. 3. With respect to the movement of the lens focusing ring 7, the focus locking lever 9 is maintained in a retracted position, as a result of which the lens focusing ring 7 rotates counterclockwise by a substantial amount. The rotation is terminated by the engagement of the extension boss E of the focusing ring 7 against the extension tab 2a of the lens cocking slide 2 when the lens cocking slide is driven to its extreme leftmost position to be arrested by engagement with its associated guide pins 3,3. As will subsequently be shown, this rotation is sufficient to move the lens to a long-focus (non-flash) position, preferably yielding a hyperfocal distance of 12 feet, thereby providing sharp focus from 6 feet to infinity.

With respect to the aperture control system, it will be noted that with the aperture control solenoid 25 deenergized, the aperture control slide 21 is free to move to the left, the lens cocking slide 2 having completely outrun pin 23 on the aperture control slide, with the result that the aperture control slide moves to the left. This has the effect of driving the aperture blade control pin 26 to the left along the cutout slots 27a,28a in the aperture blades 27,28, thereby swinging the blades together to a reduced aperture position. This reduced aperture position is chosen in conjunction with the focal length and focus position of the lens 50 with the lens focusing ring 7 rotated as shown in FIG. 3 to provide for the previously mentioned optimum hyperfocal distance of 12 feet. This is achieved by configuring the aperture control blades 27,28 so that in the reduced aperture configuration shown in FIG. 3 a focal ratio of approximately f/8 is established in the system.

Details of the mechanism whereby rotation of the focus control ring 7 moves the lens 50 between the two focusing positions thereof are best shown in FIGS. 5, 6, 7 and 8. A lens cell assembly 54 securely retains the objective lens 50 therein, the lens cell assembly having a cylindrical outer surface 62 configured to slidingly pass within an aperture 60 in a front wall 33 of the camera. A main mounting wall 35 is provided with a cylindrical passage 56 coaxially disposed with respect to the front wall aperture 60. The lens cell assembly 54 is fixedly secured to the focusing ring 70. A wave spring 32 disposed between the front surface 62 of the focusing ring and the rear surface 64 of the front wall serves to urge the lens cell assembly 54 away from the front wall. Four forwardly extending slanting ramps 31 are fixed to extend forwardly of the main mounting wall 35. The inward action of the wave spring 32 serves to force the rear surface 7b of the focusing ring against these ramps. The location of these ramps 31-31 is shown in dotted outline in FIGS. 1-4 also. With the focusing ring 7 in a cocked position (FIG. 1) or slightly rotated as shown in (FIG. 2—near mode) the ramps 31-31 urge the lens cell assembly to its forwardmost position with respect to the film plane FP.

To allow for distant focusing (far mode), four ramp-shaped recesses 7a-7a are provided in the rear surface 7b of the focusing ring 7. Upon full counterclockwise rotation of the focusing ring 7 as shown in FIG. 3, these recesses 7a are rotated to confront their associated ramp elements 31, with the result that the wave spring 32 forces the focusing ring to its rearmost position as shown in FIG. 6. This establishes the lens in the distant-focus condition. Ramp surfaces 68-68 at the ends of the recesses 7a-7a allow the focusing ring 7 to be urged forward once again when the focusing ring is rotated clockwise during the cocking operation.

Figure 9:
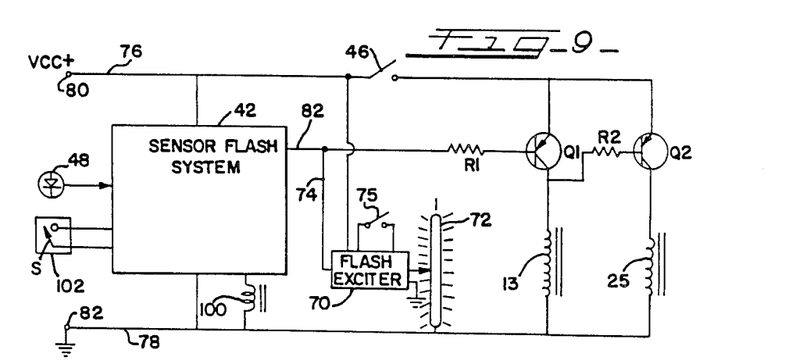
FIG. 9 is a block schematic diagram of a representative electronic control system for the camera.

One form of representative control circuit for carrying out the aforementioned synchronization of the solenoids 13,25 during exposure is shown in FIG. 9. A sensor flash system 42 responsively coupled to a photosensor 48 is powered from a source of direct voltage supplied to lines 76,78 via terminals 80,82 respectively. The sensor flash system may take a variety of forms that will be apparent to those knowledgable in the art, and as configured for the present system responds to a high ambient illumination sensing by the photosensor 48 to put an output control line 82 into a "low" state. A flash lamp 72 is energized by a flash exciter 70. Internal logic circuitry (not shown, but of conventional design) internal to the flash exciter 70 will disable the exciter from triggering the flash lamp 72 whenever control line 74 is low, i.e., under high illumination conditions.

If, on the other hand, the photosensor reads a low ambient signal, the enable/disable line 74 is in a "high" state, causing the flash exciter 70 to energize the flash lamp 72 upon closure of a shutter synchronization switch 75 (not shown in other drawings) appropriately coupled to trigger the flash lamp when the camera shutter is fully open. The state of the output control line 82 of the sensor flash system 42 is passed through a resistor R1 to apply a bias to the base of transistor Q1, having the coil of the focusing solenoid 13 connected between the collector thereof and negative power line 78. The emitter of transistor Q1 is connected directly to the positive power line 76. A second transistor Q2 similarly has its emitter connected to the positive power line 76, and has its collector connected to the negative power line 78 through the aperture control colenoid 25. The base of transistor Q2 is biased through a resistor R2 connected to the collector of transistor Q1.

Considering the actions of transistors Q1 and Q2 in terms of the base bias signal applied to transistor Q1 through resistor R1 via control line 82, it is clear that when the base of transistor Q1 is low (high illumination/far mode), transistor Q1 will be turned on, thereby energizing the focusing solenoid 13. Since the base-emitter junction of transistor Q2 is connected across the collector-emitter leads of transistor Q1, it follows that transistor Q2 must under such circumstances be turned off, as a result of which the aperture solenoid 25 is also turned off. Conversely, by raising the signal level on line 82 sufficiently, transistor Q1 is turned off and transistor Q2 is turned on. Thus, according to the output signal level on line 82, selective actuation of the two solenoids 13,25 is achieved simply by the magnitude of the ambient light level sensings of the photosensor 48. System power is supplied to the transistors Q1,Q2 through a power switch 46, here taken to comprise the blade elements 19,20 shown in FIGS. 1-4.

Figure 10:
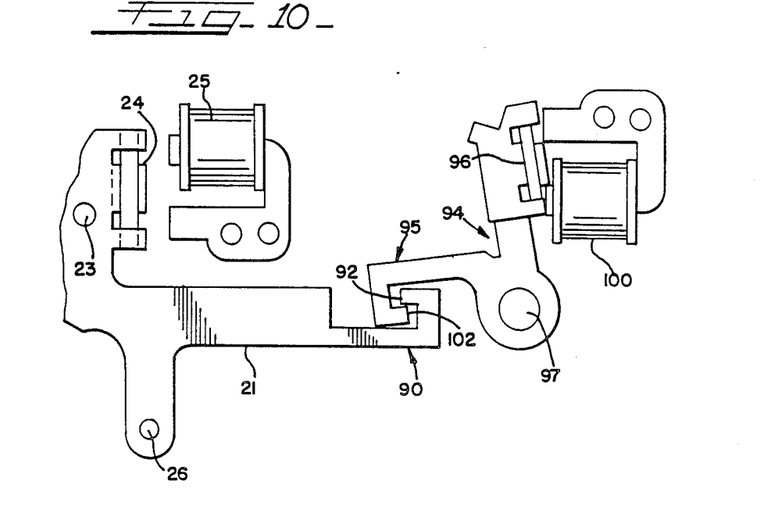
FIG. 10 shows the elements of an electrically controlled arresting system for providing two aperture settings in daylight (far) mode, the configuration shown providing for an aperture shutdown to less than its hyperfocal setting.
Figure 11:
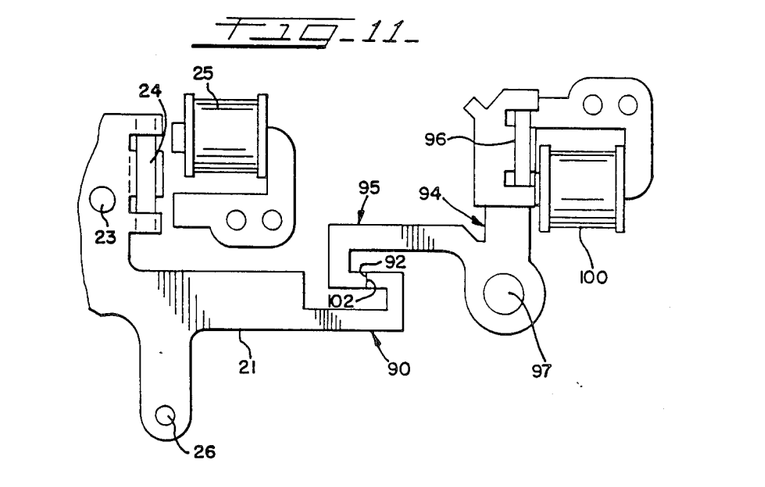
FIG. 11 shows the system of FIG. 10 in a configuration for setting the aperture stop at the hyperfocal setting.

In the daylight (far) mode provision may be made for aperture settings less than the previously described hyperfocal setting. This may be done, for example, by restricting the leftward travel of pin 26 (FIGS. 1-4) at one or more intermediate positions. FIGS. 10 and 11 show an electrically controlled solenoid latch system providing two far mode aperture settings. Thus, with particular reference to FIG. 10, a solenoid 100 having an arm assembly 94 rotatable about a pivot 97 is spring-loaded (by means not shown) to urge the pole piece 96 mounted thereon away from the solenoid. The solenoid 100 may be selectively actuated by a photosensing-related control signal from the control circuit 42 of FIG. 9. The arm assembly 94 is configured with a hook extension 95 at the end thereof, this extension having an engaging face 102 provided thereon. An extension portion 90 of the aperture control slide 21 is similarly configured with a hook-shaped extension 90 having an engaging face 92.

FIG. 10 shows the system with the solenoid deenergized and the confronting faces 92,102 offset from each other to allow maximum leftward travel of the aperture control slide 21. FIG. 11 shows the effect of energizing the solenoid 100 prior to movement of the aperture control slide 21. Here the engaging faces 92,102 are in a confronting relationship, and the movement of the aperture control slide 21 is prematurely terminated.

The aperture-controlling blades 27,28 are configured so that with the aperture slide in this intermediate position, the blades provide the proper setting, e.g., f/8, corresponding to a hyperfocal distance of 12 feet as previously described. The solenoid 100 is therefore to be energized when either the filmspeed or the ambient light is relatively low, requiring an aperture of f/8. During high ambient light conditions, or alternatively for cases of substantially higher filmspeed ratings, the solenoid 100 is held deenergized throughout the aperture-adjusting process, and the aperture control slide 21 moves fully to the left as shown in FIG. 10. In this condition the configuration of the shutter blades 27,28 is configured such that the effective aperture is substantially smaller, i.e., higher f-stop value, than that corresponding to the hyperfocal distance. This will have the effect of not only correcting the exposure, but also of sharpening up the extreme ends of the hyperfocal range by reducing the diameter of the circle of confusion for objects at infinity and 6 feet. This will contribute to overall picture clarity for objects not placed exactly at the optimal focal distance of 12 feet.

Filmspeed information may be entered into the control circuitry of the sensor flash system 42 (FIG. 9) by variety of forms well known in the art to control the slide control solenoid 100. The filmspeed entry system 102 may take the simple form of a user-operated switch S operable between two states corresponding to two substantially different filmspeed values. Alternatively, such sensings may readily be derived from the filmspeed-indicating areas currently being manufactured on the outer surface of 35 mm. film cassettes. In the simplest case, the switch S may be inserted directly in series with the solenoid 100. This will not, however, allow filmspeed to control the changeover between flash and ambient modes. Thus, the changeover between ambient illumination mode and flash mode may be controlled according to ambient illumination and filmspeed, as may the selection of the desired value of aperture stop when in the far-focus mode. It will be equally evident that a number of such intermediate stop positions may be provided by straightforward extension of the principles set forth hereinabove.

Thus, there has been described a system of automatic focus and aperture control, based solely upon ambient illumination sensings, which provides automatically for near focusing and maximum aperture so as to provide adequate depth of field within the relatively restricted object distance ranges characteristic of flash photography when the ambient illumination is low, and which further provides for an automatic reversion under high ambient illumination to place the lens-aperture combination at the hyperfocal distance, i.e., that distance placing the far edge of the field depth at infinity. The necessity for relatively expensive range-sensing systems is eliminated, and by inexpensive means a low-cost camera is provided which is well-suited to the needs of the occasional photographer.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

I claim:

1. In an improved camera having an aperture stop adjustable between a fully open and at least one reduced aperture setting, a variable focus lens, a flash system for scene illumination, a photosensor-responsive control system including aperture control means for varying the aperture stop setting and focus control means for varying the lens focus-setting and for operating said flash system between operative and inoperative states, a shutter, a shutter cocking system, and a shutter actuating system for actuating the said shutter responsively to movement of a user-operated release member, the improvement comprising:

said lens being adjustable alternatively between a far-focus position for distant objects and a near-focus position providing a shorter object focusing distance, said control system responding to ambient illumination below a given value to actuate said flash system to an operative state, said aperture stop to said fully open setting, and said lens to said near-focus position, said control system responding to ambient illumination above said given value to actuate said flash system to an inoperative state, said aperture stop to a first reduced aperture setting no greater than the hyperfocal aperture value corresponding to said far-focus position of said lens, and said lens to said far-focus position.

2. The camera of claim 1 wherein said aperture stop is settable by said aperture control means to at least two reduced aperture settings when said lens is set to said far-focus position, the larger of said at least two reduced aperture settings corresponding to said first reduced aperture setting.

3. The camera of claim 2 wherein said aperture control means responds to said photosensing means to controllingly set said aperture stop to one of said at least two reduced aperture settings responsively to the level of ambient illumination when said lens is set to said far-focus position.

4. The camera of claim 3 further including means responsive to filmspeed for controllingly adjusting the choice of said at least two reduced aperture settings.

5. The camera of claim 3 further including means responsive to filmspeed for controllingly choosing the level of ambient illumination which actuates said flash system to an operative state.

6. The camera of claim 1 wherein said first reduced aperture setting is equal to said hyperfocal aperture value.

7. The camera of claim 2 wherein said first reduced aperture setting is equal to said hyperfocal aperture value.

8. The camera of claim 1 wherein said control system includes means responsive to operation of said shutter actuating system for operating said control system to adjust the lens focusing and aperture stop setting in response to initial movement of said shutter release member before the shutter has been opened.

9. The camera of claim 1 further including spring bias means for urging said lens between one of said focusing positions and the other and for urging said aperture stop between said fully open and said reduced aperture setting, said cocking system including coupling and latching means for urging said lens and said aperture stop against the force of said spring bias means to a latched dormant position and setting respectively attendant to cocking the shutter, said latching means including means responsive to said initial movement of said release member for releasing said lens and said aperture stop from said latched dormant position and setting so that said spring bias means urges said lens from one position thereof to the other and said aperture stop from one setting thereof to the other.

10. The camera of claim 9 wherein said control system includes aperture control solenoid means responsive to said photosensing means for selectively preventing said aperture stop from moving from said one setting thereof to the other according to the sensed level of ambient illumination and focus control solenoid means responsive to said photosensing means from selectively preventing said lens from moving from said one position thereof to the other according to the sensed level of ambient illumination.

* * * * *